United States Patent
Han et al.

(10) Patent No.: US 8,492,039 B2
(45) Date of Patent: Jul. 23, 2013

(54) FUEL CELL SYSTEM AND METHOD OF CONTROLLING THE SAME

(75) Inventors: Man-Seok Han, Suwon-si (KR); Dong-Hyun Kim, Suwon-si (KR); Ming-Zi Hong, Suwon-si (KR); Ju-Yong Kim, Suwon-si (KR); Jun-Won Suh, Suwon-si (KR); Ria Ju, Suwon-si (KR); Yasuki Yoshida, Suwon-si (KR); Woong-Ho Cho, Suwon-si (KR); Hyun Kim, Suwon-si (KR); Jin-Hong An, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 553 days.

(21) Appl. No.: 12/385,619

(22) Filed: Apr. 14, 2009

(65) Prior Publication Data
US 2009/0258261 A1     Oct. 15, 2009

(30) Foreign Application Priority Data
Apr. 15, 2008 (KR) ........................ 10-2008-0034637

(51) Int. Cl.
H01M 8/04 (2006.01)
H01M 8/18 (2006.01)

(52) U.S. Cl.
USPC ........... 429/429; 429/428; 429/433; 429/434; 429/437; 429/443

(58) Field of Classification Search
USPC ................. 429/429, 433, 434, 428, 437, 443
See application file for complete search history.

(56) References Cited

U.S. PATENT DOCUMENTS

| 6,146,779 A | 11/2000 | Walsh |
| 6,468,681 B1* | 10/2002 | Horiguchi ..................... 429/437 |
| 2003/0157380 A1 | 8/2003 | Assarabowski et al. |
| 2005/0164051 A1* | 7/2005 | Venkataraman et al. ....... 429/17 |
| 2006/0057444 A1* | 3/2006 | Takagi et al. ................... 429/20 |

(Continued)

FOREIGN PATENT DOCUMENTS

| CN | 200610127612 | 8/2006 |
| EP | 1-793-441 A2 | 6/2007 |

(Continued)

OTHER PUBLICATIONS

Korean office Action issued by Korean Patent Office on Mar. 31, 2010 corresponding Korean Patent Application No. 10-2008-0034637 and Request for Entry of the Accompanying Office Action attached herewith.
European Office Action dated Jul. 30, 2010 of the European Patent Application No. 09290262.6 which claims priority of the corresponding Korean Priority Application No. 10-2008-0034637.
Chinese Office Action dated Nov. 26, 2010 corresponding to Chinese Patent Application No. 200910131866.5, together with full English translation.

(Continued)

*Primary Examiner* — Milton I Cano
*Assistant Examiner* — Jeremiah Smith
(74) *Attorney, Agent, or Firm* — Robert E. Bushnell, Esq.

(57) ABSTRACT

A fuel cell system and a control method thereof are capable of preventing anode flooding due to a temperature difference between a stack and reformate upon starting a fuel cell system. The method of controlling a fuel cell system including steps of detecting a temperature of a fuel cell stack, detecting a temperature of reformate that is generated in a fuel reformer and then is supplied to the fuel cell stack through a heat exchanger, and setting the temperature of the reformate to be lower than the temperature of the fuel cell stack during a starting time of the fuel cell system.

13 Claims, 3 Drawing Sheets

U.S. PATENT DOCUMENTS

2006/0216562 A1 9/2006 Edlund et al.
2007/0231640 A1* 10/2007 Clingerman et al. ........... 429/22
2008/0008915 A1* 1/2008 Arikara et al. ................. 429/25

FOREIGN PATENT DOCUMENTS

| JP | 08-138704 | 5/1996 |
| JP | 09-312165 | 12/1997 |
| JP | 10-255828 | 9/1998 |
| JP | 2002252095 | 5/2002 |
| JP | 2002298898 | 10/2002 |
| JP | 2004-281421 A | 10/2004 |
| JP | 2005093346 | 4/2005 |
| JP | 2005116257 | 4/2005 |
| JP | 2005-285562 | 10/2005 |
| JP | 2006-169013 | 6/2006 |
| JP | 2006172948 | 6/2006 |
| JP | 2006-286280 A | 10/2006 |
| JP | 2007-012636 | 1/2007 |
| KR | 10-2003-0073677 | 9/2003 |
| WO | 2004015800 A2 | 2/2004 |

OTHER PUBLICATIONS

European Office Action issued by the European Patent Office on Jul. 30, 2009 in the corresponding to European Patent Application No. 09290262.6.

Japanese Office Action issued by JPO on Sep. 20, 2011 in connection with Japanese Patent Application Serial No. 2008-170225, which also claims Korean Patent Application Serial No. 10-2008-0034637 as its priority document, and Request for Entry of the Accompanying Office Action attached herewith.

Chinese Office action issued on Jul. 24, 2012 in connection with Chinese Patent Application No. 200910131866.5, which claims priority of the corresponding Korean Application No. 10-2008-0034637 and its English translation attached herewith.

Japanese Office Action issued on Jun. 26, 2012 in the corresponding Korean patent application No. 10-2008-0034637.

European Office action issued by the European Patent Office on Oct. 22, 2012 in corresponding to European Patent Application No. 09 290 262.6-1227 attached herewith.

* cited by examiner

FUEL CELL SYSTEM AND METHOD OF CONTROLLING THE SAME

CLAIM OF PRIORITY

This application makes reference to, incorporates the same herein, and claims all benefits accruing under 35 U.S.C. §119 from an application for FUEL CELL SYSTEM AND METHOD OF CONTROLLING THE SAME earlier filed in the Korean Intellectual Property Office on 15 Apr. 2008 and there duly assigned Serial No. 10-2008-0034637.

BACKGROUND OF THE INVENTION

1. Field of the Invention

The present invention relates to a fuel cell system and a method of controlling the same capable of preventing anode flooding due to a temperature difference between a stack and reformate upon starting the fuel cell system.

2. Description of the Related Art

In general, a fuel cell is a system that directly converts chemical energy into electric energy by the electro-chemical reaction of fuel and an oxidant. The fuel cell has been spotlighted as next-generation power generation technology, since it does not need a combustion process or a driving apparatus like an existing turbine generator and has high power generation efficiency as well as does not generate environmental problems such as air pollution, vibration, noise, etc. The fuel cell may be categorized into a phosphoric acid fuel cell, an alkaline fuel cell, a polymer electrolyte membrane fuel cell, a molten carbonate fuel cell, a solid oxide fuel cell, etc. according to the kind of electrolyte. The respective fuel cells are basically operated in the same principle, but have different types of fuels, operation temperatures, catalysts, electrolytes, etc. These fuel cells have been researched and developed for various uses, such as an industrial use, a household use, a leisure use, etc. In particular, some fuel cells have been researched and developed as a power supply of a transportation means, such as vehicles, ships, etc.

Among others, the polymer electrolyte membrane fuel cell (PEMFC), which uses a solid polymer membrane, not a liquid electrolyte, as an electrolyte, has advantages of high output characteristics, low operating temperature, and a rapid starting and response characteristics, as compared to the phosphoric acid fuel cell, and is widely applicable to a portable power, portable electronic devices, transportation, such as a car, a yacht, as well as a distributed power, such as a stationary power generating stations used in a house and a public building, etc.

The polymer electrolyte membrane fuel cell system can be largely represented by two component groups, that is, a stack and a system and an operation part. The stack directly generates electricity by the electro-chemical reaction of fuel and an oxidant, and includes an anode electrode catalyst, a cathode electrode catalyst, and a membrane-electrode assembly of an electrolyte inserted between these electrode catalysts. Also, the stack may be manufactured by a stack of a plurality of membrane-electrode assemblies. In the case of the stack-type stack, separators are disposed between the membrane-electrode assemblies. The system and operation part includes a fuel supplier, an oxidant supplier, a heat exchanger, a power converter, a controller, etc. to control the operation of the stack.

Temperature change in the aforementioned polymer electrolyte membrane fuel cell is initiated during an initial starting of the system. Since the stack does not start the electrochemical reaction of fuel and oxidant just after the system is started, the temperature of the stack is lower than the temperature at normal operation state. Electric energy and heat are generated with time from the stack through the electrochemical reaction of fuel and oxidant after the start of the operation. The temperature of the stack gradually rises due to the generated heat during the operation.

Meanwhile, if a reformate, which is heat-exchanged at the normal operation temperature, is supplied to the anode of the stack upon starting the system, because the stack usually has lower operation temperature than the normal operation temperature, a considerable amount of steam included in the reformate is condensed in the inside of the stack. The condensation of steam in the inside of the stack leads to a problem of anode flooding, thereby hindering the normal starting and operation of the stack.

In particular, water condensed in the inside of the stack is likely to be collected in the lower of the stack. In this case, some cells in the stack may sink under water. These cells generate reverse voltage to the stack to hinder the starting of the stack. Furthermore, if the system with the aforementioned problems is repeated, the stack performance can be suddenly degraded.

SUMMARY OF THE INVENTION

It is an object of the present invention to provide a fuel cell system and a method of controlling the same capable of preventing anode flooding due to a temperature difference between a stack and reformate upon starting the fuel cell system.

In order to accomplish the object, there is provided a method of controlling a fuel cell system according to one aspect of the present invention. The method includes detecting a temperature of a fuel cell stack, detecting a temperature of reformate that is generated in a fuel reformer and then is supplied to the fuel cell stack through a heat exchanger, and setting the temperature of the reformate to be lower than the temperature of the fuel cell stack during a starting time of the fuel cell system.

The step of setting the temperature of the reformate may include a step of setting the temperature of the reformate to maintain relative humidity to be in a range of 90% to 50% based on the temperature of the fuel cell stack. The step of setting the temperature of the reformate may include a step of boosting heat exchanging performance of the heat exchanger higher during the starting time of the fuel cell system than during a normal operation time of the fuel cell system. The detecting the fuel cell stack temperature may includes detecting the temperature of the volume central portion of the fuel cell stack.

The method of controlling the fuel cell system may further include supplying the reformate to the fuel reformer whenever the temperature of the reformate is equal to or higher than the temperature of the fuel cell stack.

The method of controlling the fuel cell system may further include supplying oxidant to a cathode of the fuel cell stack.

There is provided a fuel cell system according to another aspect of the present invention. The fuel cell system includes a fuel cell stack for producing electricity, a first sensor detecting a temperature of the fuel cell stack, a fuel reformer generating reformate and supplying the reformate to the fuel cell stack, a heat exchanger coupled between the fuel cell stack and the fuel reformer, a second sensor detecting the temperature of the reformate in the heat exchanger, and a controller coupled to each of the fuel cell stack and the heat exchanger. The heat exchanger controls a temperature of the reformate that is supplied from the fuel reformer. The controller controls the heat exchanger to set the temperature of the reformate to be lower than the temperature of the fuel cell stack during a starting time of the fuel cell system.

The controller may control the heat exchanger to set the temperature of the reformate to maintain relative humidity to be in a range of 90% to 50% based on the temperature of the fuel cell stack. The controller may boost heat exchanging performance of the heat exchanger higher during the starting time of the fuel cell system than during a normal operation time of the fuel cell system. The heat exchanger may include a main heat exchanger and an auxiliary heat exchanger. The auxiliary heat exchanger may be operated only during the starting time of the fuel cell system. The controller operates the main heat exchanger and the auxiliary heat exchanger together upon starting the system, making it possible to increase the heat exchanging performance.

The fuel cell system may further include a valve disposed between the fuel reformer and the fuel cell stack. The valve guides the flow of the reformate into the fuel reformer whenever the temperature of the reformate is equal to or higher than the temperature of the fuel cell stack.

The controller may include a heat exchanging temperature controlling apparatus for automatically controlling the operation of the heat exchanger by reading the temperature of the fuel cell stack. The fuel cell system may further include an oxidant supplier supplying oxidant to a cathode of the fuel cell stack.

The fuel cell stack includes a stack in a polymer electrolyte membrane fuel cell scheme.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
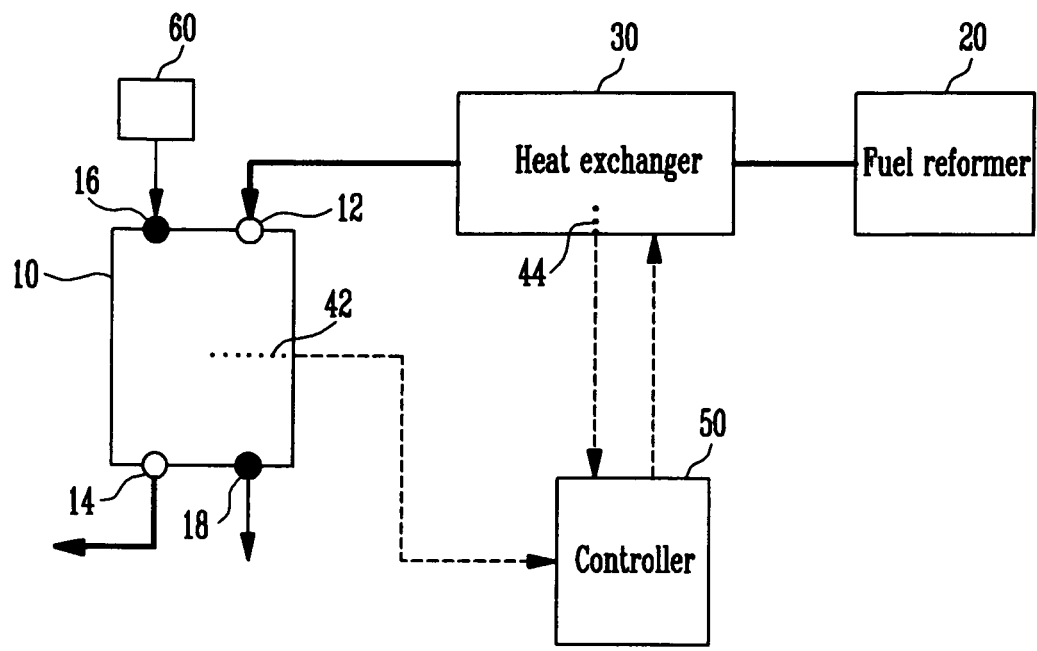
FIG. 1 is a block diagram of a fuel cell system according to one embodiment of the present invention.

Hereinafter, a preferred embodiment of the present invention will be described in a more detailed manner with reference to the accompanying drawings. The following embodiment is provided for those skilled in the art to fully understand the present invention. The detailed description of known functions and configurations will be omitted so as not to obscure the subject of the present invention with unnecessary detail. However, in order to clearly explain the present invention, the parts not associated with the description are omitted in the drawings and like elements are denoted by like numerals throughout the drawings and the thickness or the size of each component may be exaggerated for convenience or clarity of explanation. Also, a term referred to as a fuel cell stack is used throughout the specification, but this is for convenience of use. The fuel cell stack may include a stack-type stack or a flat-type stack.

FIG. 1 is a block diagram of a fuel cell system according to one embodiment of the present invention.

Referring to FIG. 1, the fuel cell system includes a fuel cell stack 10, a fuel reformer 20 generating reformate to be supplied to the fuel cell stack 10, a heat exchanger 30 controlling the temperature of the reformate supplied from the fuel reformer 20 to the fuel cell stack 10, a first sensor 42 detecting the temperature of the fuel cell stack 10, a second sensor 44 detecting the temperature of the heat exchanger 30 or the reformate, and a controller 50 controlling the temperature of the reformate to be maintained lower than the temperature of the fuel cell stack or to be maintained within a predetermined range during the initial starting time of the fuel cell system.

The fuel cell stack 10 basically includes an anode electrode catalyst, a cathode electrode catalyst, and membrane-electrode assemblies of an electrolyte inserted between these electrode catalysts. Also, the fuel cell stack 10 can be manufactured by stacking the plurality of membrane-electrode assemblies. In the stack-type fuel cell stack, separators are disposed between the membrane-electrode assemblies.

The aforementioned fuel cell stack 10 generates electric energy and heat by an electro-chemical reaction of fuel supplied through an anode inlet 12 and an oxidant supplied through a cathode inlet 16. The fuel and oxidant supplied to the fuel cell stack 10 may be discharged out of the stack 10 through an anode outlet 14 and a cathode outlet 18, respectively. The aforementioned fuel can be obtained by reforming raw materials, such as natural gas, methanol, ethanol, etc.

The fuel reformer 20 is an apparatus for supplying fuel, such as hydrogen, to the fuel cell stack 10. The fuel reformer 20 generates a hydrogen-rich reformate by reforming raw materials, such as natural gas, methanol, ethanol, etc. The fuel reformer 20 may involve a catalyst process for a reforming reaction consisting of steam reforming, partial oxidation reforming, autothermal reforming, or a combination thereof. Also, the fuel reformer 20 may involve a catalyst process for removing impurities, such as carbon monoxide, sulfur, etc in fuel. The aforementioned catalyst process includes a catalyst process for water gas shift (WGS) and a catalyst process for preferential oxidation.

The heat exchanger 30 is an apparatus transferring heat generated during operation of the fuel cell system out of the system. The heat exchanger 30 may function to make the fuel cell stack 10, a motor, various controllers, etc operating at constant temperature. In particular, the heat exchanger 30 of the present embodiment controls the temperature of reformate supplied from the fuel reformer 20 during the system starting time to set the temperature of reformate to be slightly lower than the temperature of the fuel cell stack. In this case, it can be described that the temperature of reformate is linked to the temperature of the fuel cell stack.

The first sensor 42 is a temperature sensor capable of detecting the temperature of the fuel cell stack 10 that can be suddenly changed from a room temperature at the start of the system to a normal operation temperature during the operation of the system. Preferably, the first sensor 42 is installed inside the stack in order to accurately detect the temperature of the fuel cell stack 10.

The second sensor 44 is a temperature sensor capable of detecting the temperature of the reformate. The second sensor 44 may be installed to detect any one of the temperature of the heat exchanger 30, the temperature of the reformate flowing through heat exchanger 30, and the temperature of the reformate flowing into the anode inlet 12 of the fuel cell stack 10.

The first sensor 42 and the second sensor 44 may include any one of a thermistor, a resistance temperature detector, a thermocouple, a semiconductor temperature sensor, etc.

The controller 50 receives temperature signals detected in the first sensor 42 and the second sensor 44 through a predetermined input port. The controller 50 determines the temperature of the fuel cell stack 10 and the temperature of the reformate from the received temperature signals. An input port of the controller 50 may include an analog-digital converter. The controller 50 may be implemented by logic circuits using microprocessors or flip-flops.

Also, the controller 50 controls the heat exchanger 30 by monitoring the temperature of the reformate, which is to be supplied to the fuel cell stack 10, and by monitoring the temperature of the fuel cell stack 10 in order to maintain the temperature of the reformate to be lower than the temperature of the fuel cell stack 10. Preferably, the temperature of the reformate is set in a range of temperature corresponding to relative humidity of about 90% to 50% based on the temperature of the fuel cell stack 10.

Table 1 shows an amount (gr/m$^3$) of saturated steam in the temperature range between 20° C. and 69° C. ("gr" stands for gram). The amounts of the saturated steam are arranged in a two dimensional array in Table 1, with each row representing temperature change by 10° C. and with each column representing temperature change by 1° C.

TABLE 1

| Amount (gr/m$^3$) of saturated steam | | Temperature (1° C. interval) | | | | | | | | | |
|---|---|---|---|---|---|---|---|---|---|---|---|
| | | 0 | 1 | 2 | 3 | 4 | 5 | 6 | 7 | 8 | 9 |
| Temp. | 60 | 129.8 | 135.6 | 141.5 | 147.6 | 153.9 | 160.5 | 167.3 | 174.2 | 181.6 | 189.0 |
| (10° C. | 50 | 82.9 | 86.9 | 90.9 | 95.2 | 99.6 | 104.2 | 108.9 | 114.0 | 119.1 | 124.4 |
| interval) | 40 | 51.0 | 53.6 | 56.4 | 59.2 | 62.2 | 65.3 | 68.5 | 71.8 | 75.3 | 78.9 |
| | 30 | 30.3 | 32.0 | 33.8 | 35.6 | 37.5 | 39.5 | 41.6 | 43.8 | 46.1 | 48.5 |
| | 20 | 17.3 | 18.3 | 19.4 | 20.6 | 21.8 | 23.0 | 24.3 | 25.7 | 27.2 | 28.7 |
| | 10 | 9.40 | 10.0 | 10.6 | 11.3 | 12.1 | 12.8 | 13.6 | 14.5 | 15.4 | 16.3 |

If the temperature of the fuel cell stack 10 is 31° C. under atmospheric pressure, Table 1 shows that an amount of saturated steam is 32.0 gr/m$^3$. The reformate temperature is selected in the temperature range with moisture smaller than an amount of saturated steam 32.0 gr/m3 at 31° C. by predetermined amount. For example, if the moisture amount of reformate is set to be relative humidity of 90% based on the temperature of the fuel cell stack 10, the amount of moisture of reformate at relative humidity of 90% is 0.9 times 32.0 gr/m$^3$, that is, 28.8 gr/m$^3$. Therefore, the temperature of reformate is set to the temperature corresponding to the moisture amount of 28.8 gr/m$^3$. In this case, the reformate temperature is about 29° C. referring to Table 1. For another example, if the moisture amount of reformate is set to be relative humidity of 50% based on the temperature of the fuel cell stack 10, which is 31° C., the moisture amount of reformate is 0.5 times 32.0 gr/m$^3$, that is, 16.0 gr/m$^3$. Therefore, the reference temperature of reformate is the temperature corresponding to the moisture amount of 16.0 gr/m$^3$, which is about 19° C. or 20° C.

Furthermore, the controller 50 of the fuel cell system of the present invention can apply different references, depending on the progress at the operation of the fuel cell system, to control the temperature of reformate. For example, the controller in the fuel cell system can set the temperature of reformate to about 29° C. when the temperature of the fuel cell stack 10 is 31° C., which is the temperature when the system starts. At this time, the reference may be the relative humidity of 90% based on the temperature of the fuel cell stack 10. Whenever the fuel cell stack 10 reaches a normal operation condition, the controller 50 can apply a different reference to control the temperature of reformate. For example, the controller 50 can change the reference to relative humidity of 50% based on the temperature of the fuel cell stack 10 whenever the temperature of the fuel stack 10 reaches a predetermined temperature. If temperature of the fuel cell stack 10 is about 61° C. in a normal operation condition, the controller 50 can set the temperature of reformate to about 46° C. by applying the reference of relative humidity of 50% based on the temperature of the fuel cell stack 10.

In the aforementioned description, for convenience of explanation, the setting process of the temperature of reformate does not include the pressure effect of reformate in a pipe coupling the fuel reformer 20 to the anode inlet 12 of the fuel cell stack 10. If the pressure applied to the reformate passing through the pipe is considered, the moisture amount included in reformate will be further reduced. Therefore, it is possible to set the temperature of reformate to be slightly lower or higher in consideration of the pressure in the pipe according to the position measuring the temperature of reformate. Furthermore, because reformate is not air in atmosphere, the moisture amount included in the reformate may be slightly different from a value shown in Table 1.

The aforementioned fuel cell system generates electric energy and heat through electro-chemical reactions of hydrogen and oxygen, which are represented in Reaction Formulas 1 to 3. The hydrogen containing reformate is generated in the fuel reformer 20 and then is heat-exchanged through the heat exchanger 30. The hydrogen containing reformate is supplied to the anode inlet 12, and oxygen in air is supplied to the cathode inlet 16 through an oxidant supplier 60. The oxidant supplier 60 may include an air pump or a blower.

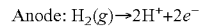

Anode: $H_2(g) \rightarrow 2H^+ + 2e^-$    Reaction Formula 1

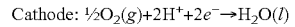

Cathode: $\frac{1}{2}O_2(g) + 2H^+ + 2e^- \rightarrow H_2O(l)$    Reaction Formula 2

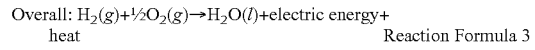

Overall: $H_2(g) + \frac{1}{2}O_2(g) \rightarrow H_2O(l)$ + electric energy + heat    Reaction Formula 3

Figure 2:
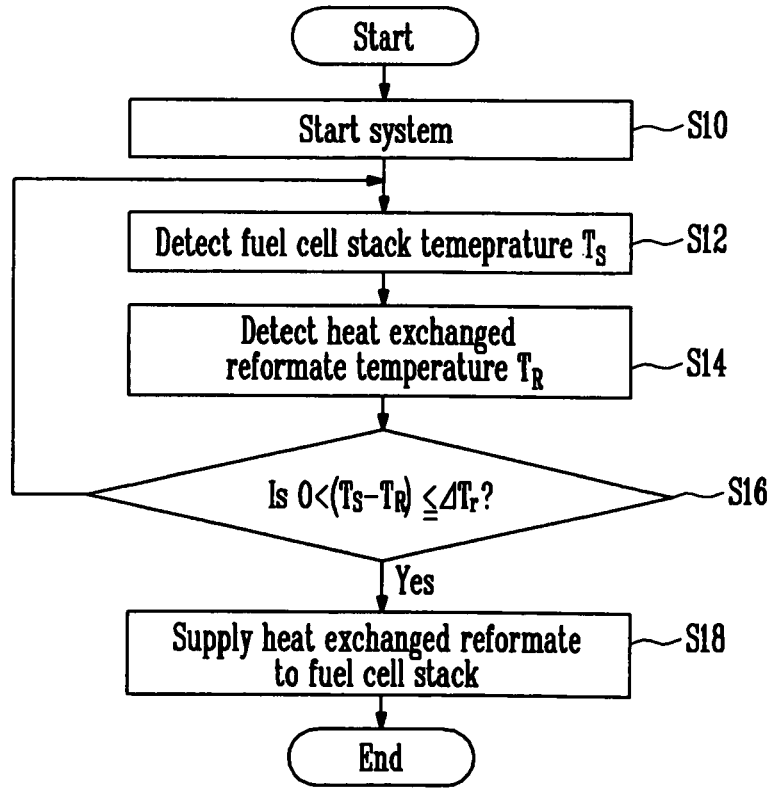
FIG. 2 is a flow chart of a method of controlling the fuel cell system according to one embodiment of the present invention.

A process of controlling the aforementioned fuel cell system will be described in more detail. FIG. 2 is a flow chart of a method of controlling the fuel cell system according to one embodiment of the present invention;

As shown in FIG. 2, the control method of the fuel cell system of the present invention includes following steps. First, the control method of the present invention includes a step of starting the system (S10). The step S10 may include a step of performing an operation required for starting the system after detecting a user's switch operation or an operation control signals generated by a programmed operation routine in the controller. Also, the control method includes a step of detecting the temperature $T_S$ of the fuel cell stack (S12) while the system starts. The step S12 may include a step of periodically detecting the temperature of the fuel cell stack through the first sensor 42 coupled to the fuel cell stack, and a step of periodically monitoring the detected temperature via the controller 50.

Also, the control method includes a step of detecting temperature $T_R$ of reformate (S14), generated in the fuel reformer 20, while the system starts. The detection of temperature $T_R$ of reformate in step S14 may be performed through the second sensor 44, and includes a step of periodically detecting the temperature of the heat exchanger or the reformate, and a step of periodically monitoring the detected temperature via the controller. Also, the control method includes a step of determining whether the temperature $T_R$ of reformate is lower than the $T_S$ of the fuel cell stack and whether the temperature difference $(T_S-T_R)$ is the same or less than a reference temperature difference $\Delta Tr$ (S16). The reference temperature difference is a value by subtracting a reference temperature from the temperature of the fuel cell stack. Here, the reference temperature corresponds to one of the temperatures with the amount of saturated steam of about 90% to about 50% with respect to the amount of saturated steam of the $T_S$ of the fuel cell stack. If the temperature of reformate is within the temperature range that is bounded by the temperature of the fuel cell stack and the reference temperature difference, the humidity of the inside of the stack may be maintained at the predetermined moisture range. But if the reformate temperature is higher than the temperature of the fuel cell stack, the anode flooding may occur in the inside of the stack.

In the step S16, if the temperature of reformate is within the optimized temperature range ("Yes" in step S16), the control method includes a step of supplying the heat exchanged reformate to the fuel cell stack (S18). The step S18 may include a step of opening the channel of the valve installed at the anode inlet side of the fuel cell stack. The valve includes a solenoid valve. In the step S16, if the temperature is out of the optimized temperature range ("No" in step S16), the control method includes a step of returning to the step S12. In this case, the reformate not supplied to the fuel cell stack 10, and may be supplied to the fuel reformer 20 and may be used as fuel for heating the fuel reformer 20.

Figure 3:
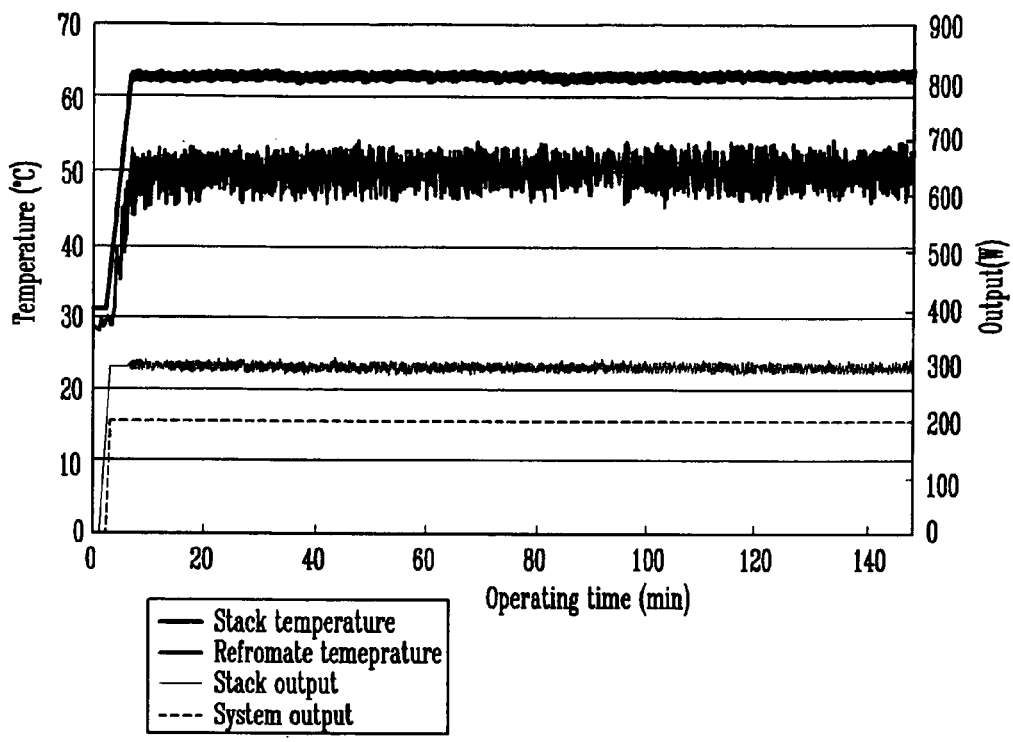
FIG. 3 is a graph for explaining an operation process of a fuel cell system of the present invention.

FIG. 3 is a graph for explaining an operation process of a fuel cell system of the present invention.

The present experimental example uses the fuel cell system of 200 W. As shown in FIG. 3, the temperature of the fuel cell stack just after starting the system is about 31° C., which is approximately a room temperature. The temperature of the fuel cell stack suddenly rises from about 31° C. to about 63° C. in about 10 minutes after the system starts. Herein, a time period just after the system starts operation is referred to as a starting time of the fuel cell system. In the example shown in FIG. 3, the starting time is the time period in which the temperature of the fuel cell stack is around 31° C. A time period after the operation of the fuel cell system is stabilized is referred to as a normal operation time of the fuel cell system. In the example shown in FIG. 3, a normal operation time of the fuel cell system is the time period, in which the temperature of the fuel cell stack is maintained around 63° C. Furthermore, a time period in which the temperature of the fuel cell stack rises gradually from about 31° C. to about 63° C. is referred to as a stabilizing time of the fuel cell system.

If the temperature of reformate is controlled to be about 50° C., which may be a proper temperature for the normal operation state of the fuel cell stack, in which the temperature of the stack is about 63° C., during the aforementioned system starting time, and if the reformate is then supplied to the fuel cell stack, a considerable amount of steam included in the reformate is condensed due to the stack temperature lower than the reformate temperature inside the fuel cell stack. The condensed water blocks the anode inlet or the fuel channel of the anode to hinder the supply of reformate. Then, the condensed water is collected in the lower part of the fuel cell stack. In this case, the cell positioned at the lower part of the fuel cell stack sinks under water so that it is not normally started or generates reverse voltage, thereby having an adverse effect on the stack.

However, the control method of the fuel cell system of the present embodiment controls the temperature of reformate, which is to be supplied to the fuel cell stack, to be lower than the temperature of the fuel cell stack, maintaining a predetermined temperature difference therebetween, thereby preventing the aforementioned problems. In other words, the present experimental example controls the temperature of reformate to rise from about 29° C. to about 50° C. by maintaining a predetermined temperature difference between the reformate and the fuel cell stack, while the temperature of the fuel cell stack rises from about 31° C. to about 63° C. The reference temperature difference for controlling the temperature of reformate is set to maintain the relative humidity of about 90% to 50% in the inside of the fuel cell stack, while maintaining the temperature of reformate to be lower than the temperature of the fuel cell stack, when the reformate is supplied to the inside of the fuel cell stack.

As shown in FIG. 3, since humidity inside the stack is reduced during the normal operation state of the system compared to the starting time, the reformate is controlled to have lower relative humidity at the time of the normal operation than the starting time. When the fuel cell stack temperature is about 63° C. at the normal operation state, the reformate temperature is set to about 48° C. to about 52° C.

With the present embodiment, the difference between the temperature of the stack and the temperature of reformate upon starting the system prevents the excessive generation of the condensed water inside the stack as well as prevents the formation of low humidified atmosphere by the temperature mismatch between the stack and the reformate, and thus excessive dry of the inside of the stack is also prevented.

Figure 4:
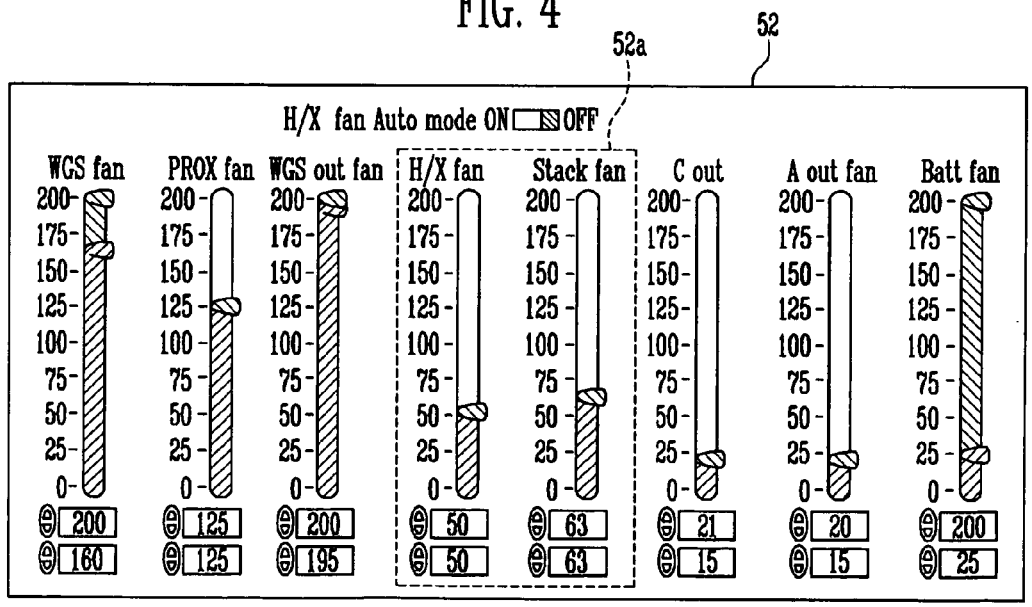
FIG. 4 is an illustrative view for a heat exchanging temperature linking apparatus adoptable in the fuel cell system of the present invention.

FIG. 4 is an illustrative view for a heat exchanging temperature control apparatus adoptable in the fuel cell system of the present invention. In other words, FIG. 4 shows one example of an interface of a heat exchanging temperature control apparatus included in the controller in the fuel cell system.

The fuel cell system of the present embodiment includes a heat exchanging temperature control apparatus 52 for controlling the temperature of reformate and the fuel cell stack. The heat exchanging temperature control apparatus 52 is included in the controller 50 to control the temperature of reformate based on the temperature of the fuel cell stack at the time of the normal operation of the system as well as during the start of system. The control apparatus 52 can be set at an automatic mode or a manual mode.

As shown in FIG. 4, the heat exchanging temperature control apparatus 52 has interfaces 52a for setting temperatures for reformate and the fuel cell stack. If the temperature of the fuel cell stack is set to 63° C. at the time of the normal operation in the heat exchanging temperature control apparatus 52, a stack fan upon starting the system will not operate before the temperature of the stack exceeds 63° C. If the temperature of reformate is set to 50° C. at the time of the normal operation, the heat exchanger fan (H/X fan) will not operate before the temperature of reformate exceeds 50° C. upon starting the system. Furthermore, although they are in the normal operation state, if the automatic mode is set to OFF, they will not operate, or operate only according to preset conditions without linkage.

Meanwhile, if the heat exchanging fan and the stack fan are set to the automatic mode in the heat exchanging temperature control apparatus 52, the temperature of reformate is controlled to be lower than the temperature of the fuel cell stack in a start time, in which the temperature of the stack is around room temperature, as well as during the operation of the fuel cell system, in which the temperature of the fuel cell stack rises. In other words, in the automatic mode, the temperature of reformate is automatically controlled to be lower than the temperature of the fuel cell stack, even in the case that the temperature of the fuel cell stack changes.

The fuel cell system of the present embodiment can control the temperature of reformate at a specific point of the fuel reformer in order to control the temperature of reformate based on the temperature of the fuel cell stack. For example, when the fuel reformer includes a steam reforming reactor (SR reactor), a water gas shift reactor (WGS reactor), and a preferential oxidation reactor (PROX reactor), the fuel cell system of the present embodiment can be operated to link the reformate temperature with the fuel cell stack temperature. In this case, the reformate temperature can be set in consideration of the temperature change in the PROX reactor and the temperature change in the heat exchanger. As another example, the fuel cell system of the present embodiment can be operated to link the reformate temperature from the PROX reactor with the fuel cell stack temperature. In this case, the reformate temperature can be basically set in consideration of the temperature change in the heat exchanger. In addition, the fuel cell system of the present embodiment can set the reformate temperature in consideration of the change in the pressure and temperature of reformate while passing through the pipe coupling between the fuel reformer and the fuel cell stack.

Figure 5:
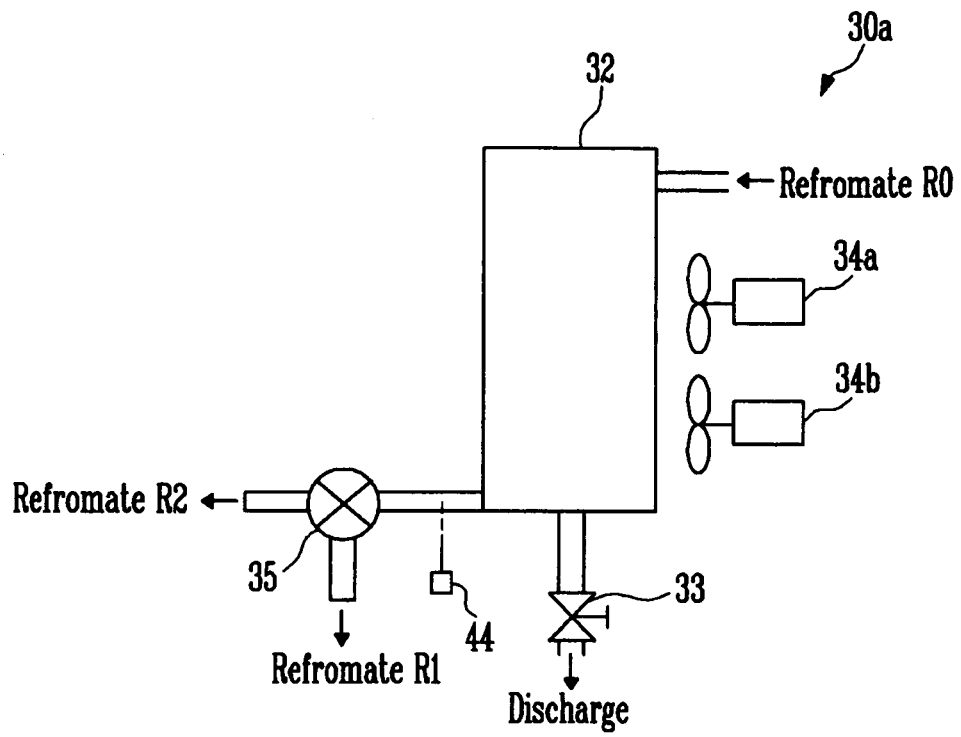
FIG. 5 is a block diagram of a heat exchanger adoptable in the fuel cell system of the present invention.

FIG. 5 is a block diagram of a heat exchanger adoptable in the fuel cell system of the present invention. Referring to FIG. 5, the heat exchanger 30*a* includes a pipe block 32 schematically shown in a box and a cooler cooling the reformate passing through the pipe block 32.

The cooler includes a first fan 34*a* and a second fan 34*b*. The pipe block 32 may be extended in a zigzag form or a spiral form. A drain valve for draining the condensed water may be coupled near the outlet of the pipe block 32. Also, the outlet of the pipe block 32 may be coupled with a 3-way valve 35 that supplies reformate R1 as oxidation fuel to the fuel reformer when the temperature of the heat exchanged reformate is higher than the temperature of the fuel cell stack, and that supplies reformate R2 to the fuel cell stack when the temperature of the heat exchanged reformate is lower than the temperature of the fuel cell stack in the predetermined range.

Two fans 34*a* and 34*b* are operated at high power to make the temperature of reformate R0 flowing in the pipe block 32 slightly lower than the temperature of the stack, which is initially around room temperature, and then, the power thereof can be slowly reduced to allow the temperature of reformate to gradually rise by monitoring and controlling the temperature of reformate based on the temperature of the fuel cell stack, which rises during operation of the fuel cell system. Also, only one of the two fans 34*a* and 34*b* can be operated to maintain the temperature of reformate at constant.

The heat exchanger 30*a* of the present embodiment can be operated to control the temperature of reformate using a high speed operation and a slow speed operation of the two fans 34*a* and 34*b*. For example, the temperature of reformate can be significantly lower than the temperature of the stack by the high speed operation during the starting time and the stabilizing time, and the temperature of reformate can properly maintain to a predetermined value lower than the stack temperature by the slow speed operation. Here, it's meant that the slow speed is slower relatively than the high speed.

Figure 6:
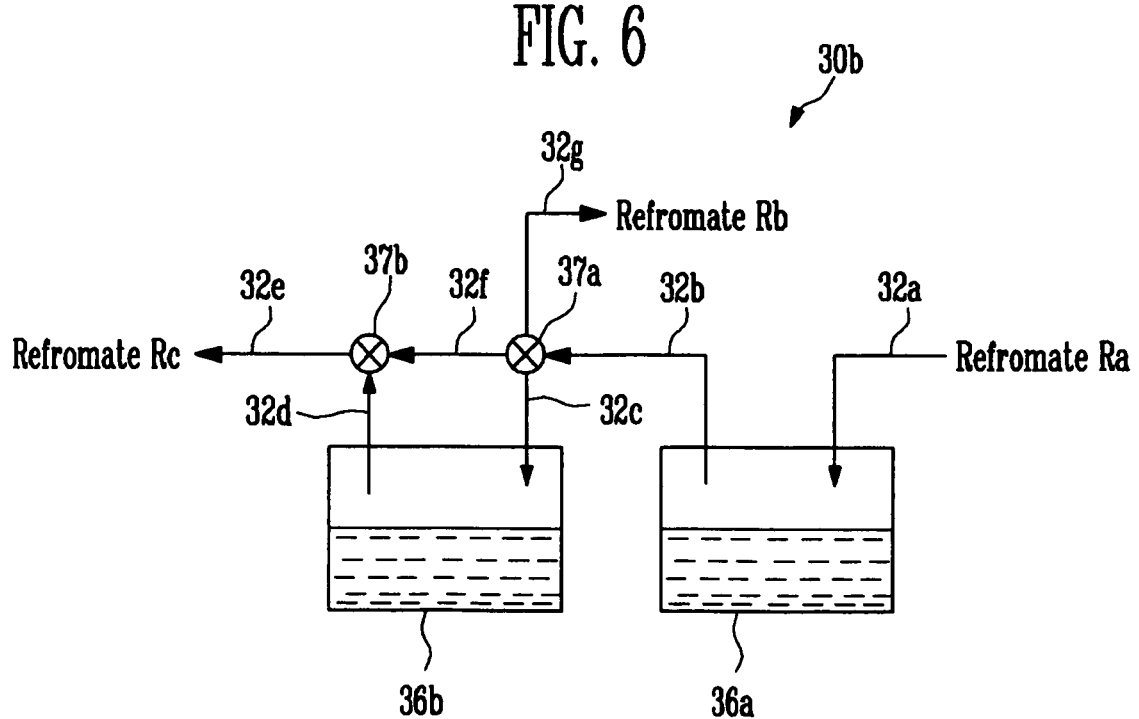
FIG. 6 is a schematic configuration view of a gas/liquid separator adoptable in the heat exchanger in the fuel cell system of the present invention.

FIG. 6 is a block diagram showing a fuel cell system including a gas/liquid separator (hereinafter, referred to as a G/L separator) according to another embodiment of the present invention.

The two G/L separators 36*a* and 36*b* of the present embodiment are basically coupled between the fuel reformer 20 and the fuel cell stack 10, referring to the system of FIG. 1. At this time, the existing heat exchanger may be installed between the fuel reformer 20 and the two G/L separators 36*a* and 36*b*. On the other hand, the two G/L separators 36*a* and 36*b* of the present embodiment may be coupled between the heat exchanger 30*a* and the fuel cell stack 10, referring to the system of FIG. 1. In this case, the reformate R2 from the heat exchanger 30*a* of FIG. 5 may be considered to flow into the first G/L separator as reformate Ra.

Referring to FIG. 6, the heat exchanger 30*b* of the present embodiment includes first to seventh pipes 32*a*, 32*b*, 32*c*, 32*d*, 32*e*, 32*f*, and 32*g* being coupled between the fuel reformer and the fuel cell stack, the first G/L separator 36*a* disposed between the first pipe 32*a* and the second pipe 32*b*, and the second G/L separator 36*b* disposed between the third pipe 32*c* and the fourth pipe 32*d*.

The heat exchanger 30*b* includes a four-way valve 37*a* coupled to the second pipe 32*b*, the third pipe 32*c*, the sixth pipe 32*f*, and the seventh pipe 32*g*. Herein, the sixth pipe 32*f* forms a bypass between the second pipe 32*b* and the fifth pipe 32*e* to supply the reformate passing through the second pipe 32*b* to the fuel cell stack through the fifth pipe 32*e* without passing through the second G/L separator 36*b*. The seventh pipe 32*g* is a pipe for supplying the reformate Rb to the fuel reformer when the temperature of reformate passing through the second pipe 32*b* is out of optimized temperature range that is determined based on the temperature of the fuel cell stack.

Also, the heat exchanger 30*b* includes a three-way valve 37*b* for selectively controlling the flow of reformate coming from the second G/L separator 36*b* through the fourth pipe 32*d*, and the flow of reformate passing through the sixth pipe 32*f*.

In the aforementioned heat exchanger 30*b*, the first G/L separator 36*a* corresponds to a main humidity controller independently operated only upon starting the system in order to control the humidity. The second G/L separator 36*b* corresponds to an auxiliary humidity controller operated to assist the first G/L separator 36*a* at the time of the system's normal operation in order to back control the humidity of reformate passing through the first G/L separator 36*a*.

The present invention supplies the reformate with lower temperature than the stack temperature in the predetermined range upon starting the system, making it possible to prevent the anode flooding problem caused in the inside of the existing stack. Also, as the stack temperature is increased in the starting period, the reformate temperature is increased accordingly, making it possible to increase the starting and operation stability of the stack and prevent the degradation of the stack performance. In addition, although the stack temperature is lower than the control value due to the instability of the stack temperature, the temperature of the heat exchanged reformate is linked with the stack temperature, making it possible to prevent the anode flooding. Also, although the stack temperature is raised exceeding the set temperature after starting the system, the reformate temperature is linked with the stack temperature, making it possible to prevent the inside of the stack to be dried.

Although a few embodiments of the present invention have been shown and described, it would be appreciated by those skilled in the art that changes might be made in this embodiment without departing from the principles and spirit of the invention, the scope of which is defined in the claims and their equivalents.

What is claimed is:

1. A fuel cell system comprising:
   a first sensor installed inside a fuel cell stack of the fuel cell system, the first sensor detecting and providing a temperature of the fuel cell stack;
   a second sensor detecting and providing a temperature of reformate in a heat exchanger, the reformate generated in a fuel reformer and being supplied to the fuel cell stack through the heat exchanger; and
   a controller coupled to the first sensor and the second sensor, the controller comparing the temperature of the fuel cell stack detected by the first sensor with the temperature of the reformate in the heat exchanger detected by the second sensor, controlling the temperature of the reformate in the heat exchanger to be lower than the temperature of the fuel cell stack during a starting time of the fuel cell system,
   wherein the controlling the temperature of the reformate comprises setting the temperature of the reformate in the heat exchanger to maintain relative humidity of the reformate in the heat exchanger to be in a range of 90% to 50% based on the temperature of the fuel cell stack, and
   wherein the actions performed by the controller are responsive to operation control signals generated by a programmed operation routine in the controller.

2. The fuel cell system of claim 1, wherein the controlling the temperature of the reformate comprises boosting heat exchanging performance of the heat exchanger higher during the starting time of the fuel cell system than during a normal operation time of the fuel cell system to set the temperature of the reformate in the heat exchanger to be lower than the temperature of the fuel cell stack during a starting time of the fuel cell system.

3. The fuel cell system of claim 2, wherein the heat exchanger comprises a main heat exchanger and an auxiliary heat exchanger, and the controlling the temperature of the reformate comprises:
   operating both of the main heat exchanger and the auxiliary heat exchanger during the starting time of the fuel cell system; and
   operating only the main heat exchanger during the normal operation time of the fuel cell system.

4. The fuel cell system of claim 1, wherein the first sensor detects the temperature of the fuel cell stack by detecting the temperature of the volume central portion of the fuel cell stack.

5. The fuel cell system of claim 1, wherein the controller controls a valve disposed between the fuel reformer and the fuel cell stack to guide a flow of the reformate into the fuel reformer whenever the temperature of the reformate is equal to or higher than the temperature of the fuel cell stack.

6. The fuel cell system of claim 1, further comprising an oxidant supplier directly supplying an oxidant to a cathode of the fuel cell stack without passing the heat exchanger.

7. A fuel cell system comprising:
   a fuel cell stack for producing electricity;
   a first sensor installed inside the fuel cell stack and detecting a temperature of the fuel cell stack;
   a fuel reformer generating reformate and supplying the reformate to the fuel cell stack;
   a heat exchanger coupled between the fuel cell stack and the fuel reformer, the heat exchanger controlling a temperature of the reformate in the heat exchanger, the reformate being
   supplied from the fuel reformer and the heat exchanger supplying the reformate to the fuel cell stack;
   a second sensor detecting the temperature of the reformate in the heat exchanger; and a controller coupled to each of the heat exchanger, the first sensor and the second sensor, the controller comparing the temperature of the fuel cell stack detected by the first sensor with the temperature of the reformate detected by the second sensor, the controller controlling the heat exchanger to set the temperature of the reformate in the heat exchanger to be lower than the temperature of the fuel cell stack during a starting time of the fuel cell system,
   wherein the controller controls the heat exchanger to set the temperature of the reformate in the heat exchanger to maintain relative humidity of the reformate in the heat exchanger to be in a range of 90% to 50% based on the temperature of the fuel cell stack, and
   wherein the actions performed by the controller are responsive to operation control signals generated by a programmed operation routine in the controller.

8. The fuel cell system according to claim 7, wherein the controller boosts heat exchanging performance of the heat exchanger higher during the starting time of the fuel cell system than during a normal operation time of the fuel cell system to set the temperature of the reformate in the heat exchanger to be lower than the temperature of the fuel cell stack during a starting time of the fuel cell system.

9. The fuel cell system according to claim 8, wherein the heat exchanger comprises a main heat exchanger and an auxiliary heat exchanger, the auxiliary heat exchanger being operated only during the starting time of the fuel cell system.

10. The fuel cell system according to claim 7, further comprising a valve disposed between the fuel reformer and the fuel cell stack, the valve guiding a flow of the reformate into the fuel reformer whenever the temperature of the reformate is equal to or higher than the temperature of the fuel cell stack.

11. The fuel cell system according to claim 7, wherein the controller comprises a heat exchanging temperature controlling apparatus for automatically controlling the operation of the heat exchanger by reading the temperature of the fuel cell stack.

12. The fuel cell system according to claim 7, further comprising an oxidant supplier directly supplying an oxidant to a cathode of the fuel cell stack without passing the heat exchanger.

13. The fuel cell system according to claim 7, wherein the fuel cell stack comprises a stack in a polymer electrolyte membrane fuel cell scheme.

* * * * *